Figure 1:
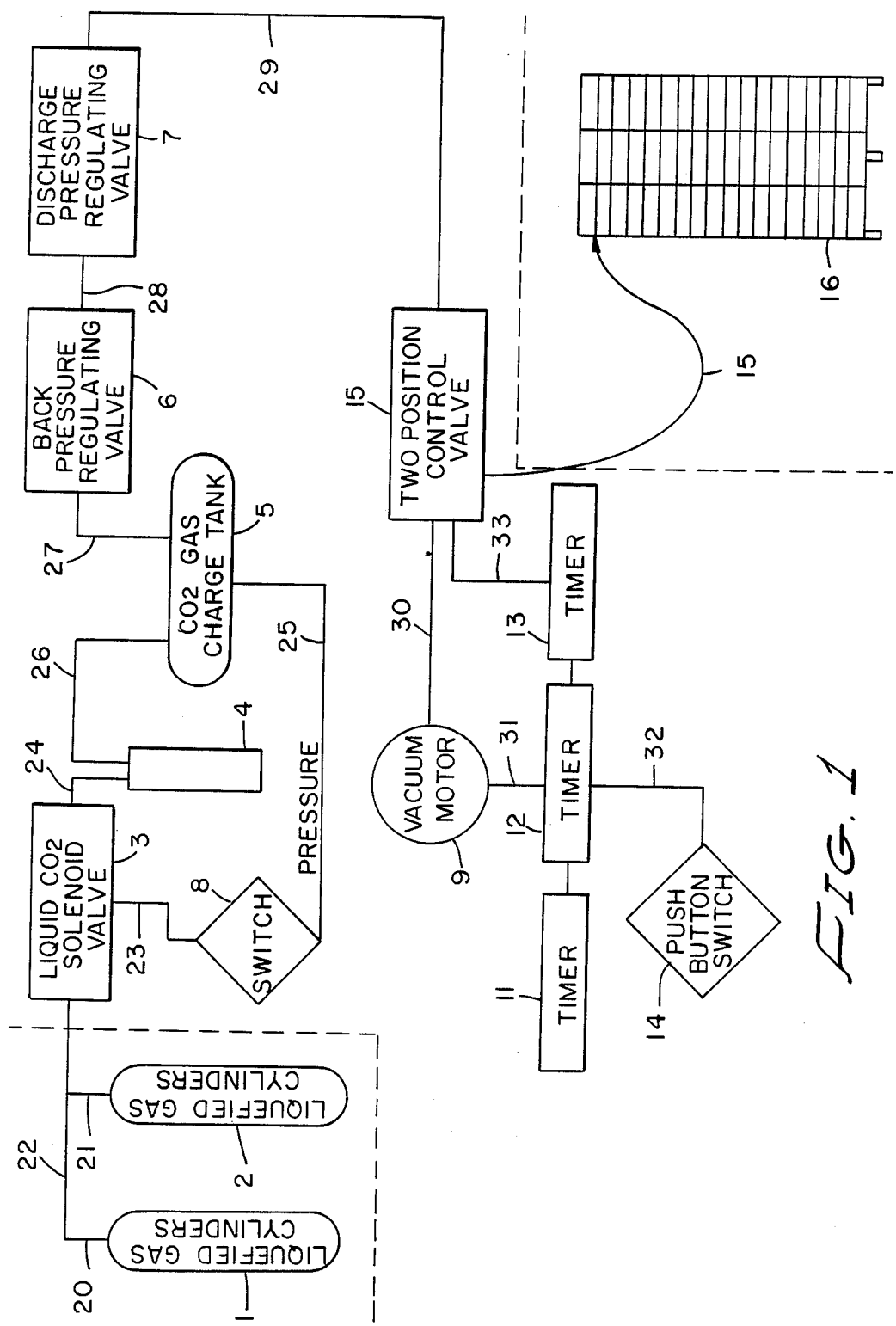

United States Patent [19]

Lashlee

[11] Patent Number: 4,843,956
[45] Date of Patent: Jul. 4, 1989

[54] SYSTEMS FOR PROVIDING AND DELIVERING PRESERVATIVE GASES TO ENCLOSURES CONTAINING PERISHABLE PRODUCTS

[75] Inventor: Curtiss N. Lashlee, Oxnard, Calif.

[73] Assignee: TransFresh Corporation, Salinas, Calif.

[21] Appl. No.: 122,893

[22] Filed: Nov. 19, 1987

[51] Int. Cl.⁴ .............................................. A23B 7/00
[52] U.S. Cl. ...................................... 99/468; 99/472; 426/231; 426/418
[58] Field of Search ............... 426/231, 320, 418, 419; 99/468, 472, 467

[56] References Cited

U.S. PATENT DOCUMENTS 4,325,296 4/1982 Ukai et al. .......................... 426/418

FOREIGN PATENT DOCUMENTS 2921706 12/1980 Fed. Rep. of Germany ........ 99/467

Primary Examiner—George Yeung
Attorney, Agent, or Firm—Bright & Lorig

[57] ABSTRACT

A system for providing and delivering a preservative gas such as carbon dioxide to an enclosure such as a palletized container for a perishable food product such as strawberries includes a mechanism for accumulating and temporarily storing a predetermined desired quantity of the preservative gas in gaseous state; adjustable, timer-controlled mechanism for withdrawing a predetermined, desired volume of air or other gases from the enclosure; adjustable, timer-controlled means for directing and delivering a predetermined, desired quantity of the preservative gas from storage to the enclosure; and a mechanism for temporarily preventing operation of the mechanism for withdrawing gases from, and for directing gases to the enclosure while the storage means is filling with preservative gas.

18 Claims, 2 Drawing Sheets

SYSTEMS FOR PROVIDING AND DELIVERING PRESERVATIVE GASES TO ENCLOSURES CONTAINING PERISHABLE PRODUCTS

This invention relates to a system for providing and delivering a preservative gas, such as carbon dioxide, or other substances that are gaseous at standard temperature and pressure, to enclosure means such as a palletized container for perishables containing one or more perishable food products such as strawberries. The system comprises means for heating and converting at least one preservative substance from liquid to gaseous state; means for accumulating and temporarily storing a predetermined, desired quantity of the preservative substance or substances in the gaseous state; adjustable, timer-controlled means for withdrawing a predetermined, desired volume of air and other gases from enclosure means for a perishable food product; adjustable, timer-controlled means for directing or delivering the predetermined, desired quantity of the preservative substance from the storing means to the enclosure; and adjustable, timer-controlled means for temporarily preventing operation of the withdrawing means and the directing means while the means for storing is filling with the preservative substance.

The invention also provides a method for providing and delivering a preservative substance that is gaseous at standard temperature and pressure to enclosure means containing one or more perishable food products such as strawberries. The method comprises heating and converting one or more preservative substances from liquid state to gaseous state, as necessary; accumulating and temporarily storing a predetermined, desired quantity of the preservative substance or substances in a gaseous state; and withdrawing a predetermined, desired volume of air, one or more other gases, or air and one or more other gases from the enclosure in response to, and under control of an adjustable, timer-controlled device; directing or delivering a predetermined, desired quantity of the preservative substance or substances in gaseous state from the storing means to the enclosure under the control of, and in response to an adjustable, timer-controlled device; and periodically interrupting the withdrawal of gases from, and delivery of gases to any enclosure while the storing means if filling with one or more preservative substances.

Figure 2:
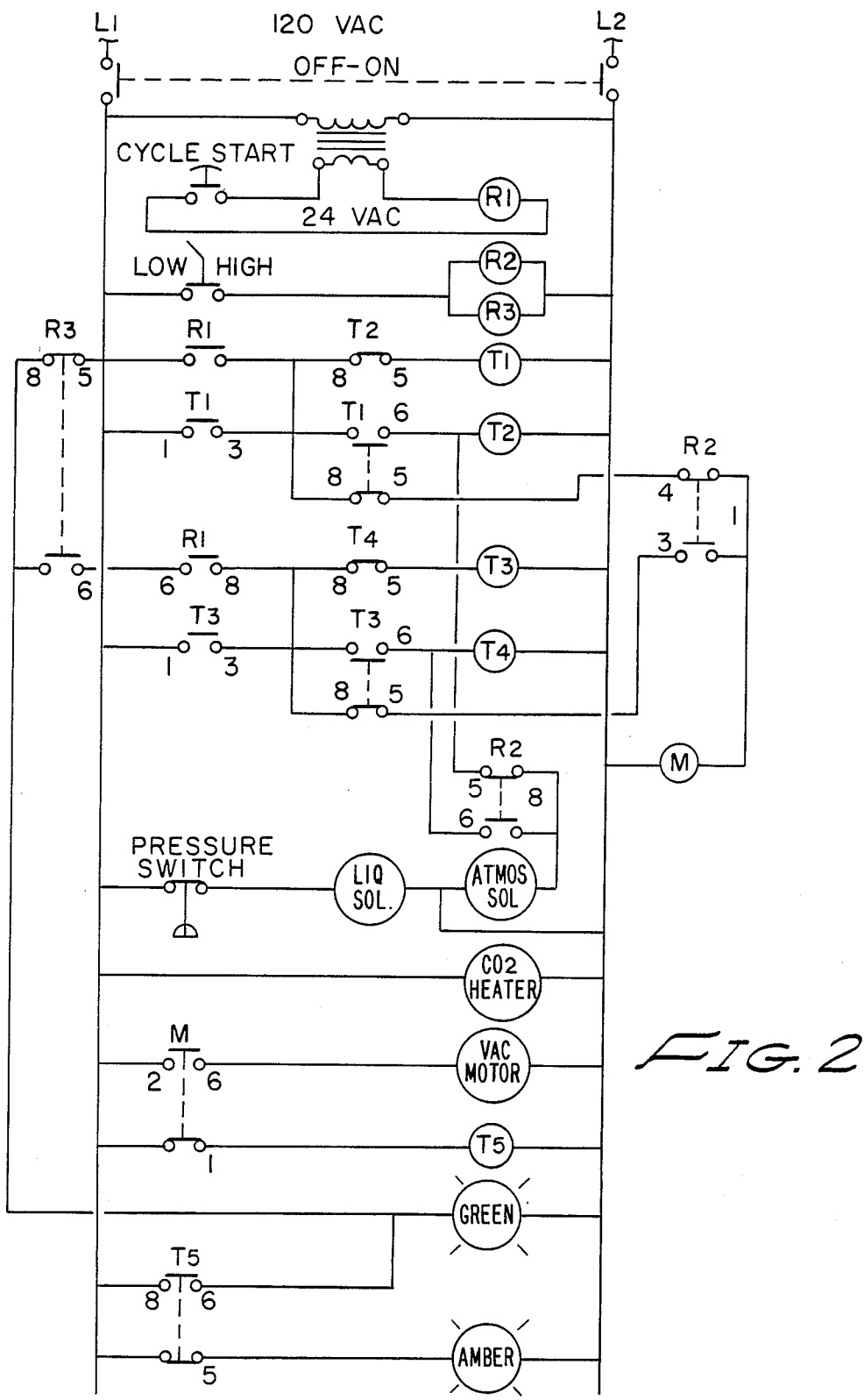

The invention can better be understood by reference to the drawings, in which:

FIG. 1 illustrates, in block function diagram form, a preferred embodiment of the system for providing and delivering one or more preservative substances in gaseous form to an enclosure containing one or more perishable food products; and FIG. 2 is a schematic diagram of the electrical controls for the embodiment shown in FIG. 1.

FIG. 1 shows a system that includes a pair of gas cylinders 1 and 2 for holding, in liquid state, a preservative substance such as carbon dioxide. Carbon dioxide flows from cylinders 1 and 2 via paths 20, 21 and 22 through valve 3 and path 24 to electric heater 4 as a liquid or a gas, or as a mixture of liquid and gas. In heater 4, any carbon dioxide in liquid form is converted by heating to carbon dioxide gas and passes via path 26 to charge tank 5. When charge tank 5 has filled to capacity with carbon dioxide, a pressure signal on path 25 to switch 8 triggers an electrical signal on path 23 to valve 3 to shut off the flow of carbon dioxide to heater 4. The carbon dioxide in tank 5 is held there, under pressure, until the system is ready to deliver this preservative gas to palletized container 16.

Adjustable timer 11 controls the period of time during which carbon dioxide flows from cylinders 1 and 2 through heater 4 to gas-charge tank 5. Timer 11 also prevents further operation of the system until charge tank 5 is fully charged with the carbon dioxide or another preservative gas, and heater 4 has stored sufficient heat energy to vaporize the next charge of gas to charge tank 5. Timer 11 is adjusted to a time appropriate to fill charge tank 5 to its full capacity.

Once a sufficient amount of time has passed for tank 5 to reach its predetermined pressure from either gaseous or liquid carbon dioxide flowing from cylinders 1 and 2, timer 12 activates vacuum motor 9 by means of an electrical signal on path 31. Vacuum motor 9 pulls air through two-position control valve 10, via paths 15 and 30, for a time sufficient to withdraw a predetermined, desired quantity of air from palletized container 16. After timer 12 expires, timer 12 delivers a signal on path 31 to vacuum motor 9, deactivating the motor and stopping the withdrawal of air from palletized container 16. Thereafter, timer 13 is activated and delivers a signal on path 33 to valve 10, changing its position to permit the flow of carbon dioxide from charge tank 5 to container 16 via path 27, back pressure regulating valve 6, path 28, pressure regulator valve 7, path 29, valve 10 and path 15. A predetermined, desired quantity of carbon dioxide is delivered to palletized container 16 in response to the time alloted by timer 13.

In this embodiment, switch 14 permits delivery of a signal via path 32 to timer 12 and timer 13 to select one of two different, predetermined time periods for delivery of preservative gas to container 16, one for palletized containers of larger size, one for palletized containers of smaller size.

FIG. 2 shows an electrical wiring circuit diagram for the embodiment shown in FIG. 1. When the system of FIG. 1 is first turned on, power from AC lines is delivered via paths L1 and L2. At first, the power activates the timer marked T5, which corresponds to timer 11 in FIG. 1. Activation of timer T5 prevents the cycling of the system while charge tank 5 fills with carbon dioxide, and heater 4 stores heat energy. Once timer T5 has timed out, contacts T5 (6, 8) close. At this point, the operator of the system can start the cycling of the system after selecting the low or high position, depending on whether the palletized container to be charged with preservative gas is of larger or smaller size.

If of smaller size, then the operator picks the low position; if of larger size, the operator picks the high position. If the operator has selected the low position, relays R2 and R3 are deenergized, the contacts R3 (5, 8) for timer T1 close, the contacts for T1 (1, 3, 5 and 8) close, and power is delivered to vacuum motor starter M, closing contact M (2, 6) and activating the vacuum motor 9 in FIG. 1. The length of time the vacuum motor operates is adjustable, and the time is selected to withdraw the amount of air or other gases from the enclosure that the operator wishes to replace with preservative gas.

After timer T1 has expired, contacts 5 and 8 of T1 open, and contacts 6 and 8 of T1 close, activating timer T2 and the atmosphere solenoid, which corresponds to valve 10 in FIG. 1. When timer T2 expires, the T2 contact (5, 8) opens, ending the timer cycle and deactivating valve 10, thereby stopping the flow of carbon dioxide to the palletized container.

If the operator had selected the high position on the low/high switch, then timers T3 and T4 would control the operation of the vacuum motor and the two-position control valve/atmosphere solenoid 10, respectively.

Once timer T2 has expired on timer T4, depending on whether the operator has selected the low or high position, then timer T5, designated timer 11 in FIG. 1, is reactivated, again preventing the operator from starting the cycling of system until the carbon dioxide gas-charged tank has filled, and heater 4 has stored sufficient heat energy once again.

What is claimed is:

1. A system for providing and delivering at least one preservative gas to enclosure means containing a perishable food product comprising means for heating and converting the preservative gas from liquid state to gaseous state; means for accumulating and temporarily storing a predetermined, desired quantity of said preservative gas in the gaseous state; adjustable, timer-controlled means for withdrawing a predetermined, desired volume of at least one gas from said enclosure; adjustable, timer-controlled means for directing the predetermined, desired quantity of preservative gas from said storing means to said enclosure; and means for temporarily preventing operation of said adjustable, timer-controlled withdrawing means and said adjustable, timer-controlled directing means while said means for storing is receiving an inflow of said preservative gas.

2. The system of claim 1 further comprising means for holding said preservative gas in liquid state, said gas being carbon dioxide.

3. The system of claim 1 further comprising switch means for delivering a signal to each of said adjustable timer-controlled means to select one of a plurality of different, predetermined time periods for delivery of said perservative gas to said enclosure.

4. A system for providing and delivering at least one preservative gas to enclosure means containing a perishable food product comprising means for accumulating and temporarily storing a predetermined, desired quantity of the preservative gas in the gaseous state; adjustable, timer-controlled means for withdrawing a predetermined, desired volume of at least one gas from said enclosure; adjustable, timer-controlled means for directing the predetermined, desired quantity of preservative gas from said storing means to said enclosure; and means for temporarily preventing operation of said adjustable, timer-controlled withdrawing means and said adjustable, timer-controlled directing means while said means for storing is receiving an inflow of said preservative gas.

5. The system of claim further 4 comprising means for holding said perservative gas in liquid state, said gas being carbon dioxide.

6. The system of claim 4 further comprising switch means for delivering a signal to each of said adjustable timer-controlled means to select one of a plurality of different, predetermined time periods for delivery of said perservative gas to said enclosure.

7. A system for providing and delivering carbon dioxide to enclosure means containing a perishable food product comprising means for accumulating and temporarily storing a predetermined desired quantity of carbon dioxide in a gaseous state; adjustable, timer-controlled means for withdrawing a predetermined, desired volume of an air-containing gas from said enclosure; adjustable, timer-controlled means for directing the predetermined, desired quantity of carbon dioxide from said storing means to said enclosure; and means for temporarily preventing operation of said adjustable, timer-controlled withdrawing means and said adjustable, timer-controlled directing means while said means for storing is receiving an inflow of carbon dioxide.

8. The system of claim 7 further comprising means for heating and converting the carbon dioxide from liquid state to gaseous state.

9. The system of claim 7 further comprising means for holding carbon dioxide in a liquid state.

10. The system of claim 7 further comprising switch means for delivering a signal to each of said adjustable timer-controlled means to select one of a plurality of different, predetermined time periods for delivery of said perservative gas to said enclosure.

11. The system of claim 1 further comprising switch means for delivering a signal to each of said adjustable, controllable means to select one of a plurality of different, predetermined time periods for delivery of said perservative gas to said enclosure.

12. A system for providing and delivering at least one preservative gas to enclosure means containing a perishable food product comprising means for accumulating and temporarily storing a predetermined, desired quantity of the preservative gas in the gaseous state; adjustable, controllable means for withdrawing a predetermined, desired volume of at least one gas from said enclosure; adjustable, controllable means for directing the predetermined, desired quantity of preservative gas from said storing means to said enclosure; and means for temporarily preventing operation of said adjustable, controllable withdrawing means and said adjustable, controllable directing means while said means for storing is receiving an inflow of said preservative gas.

13. The system of claim further 12 comprising means for holding said perservative gas in liquid state, said gas being carbon dioxide.

14. The system of claim 12 further comprising switch means for delivering a signal to each of said adjustable controllable means to select one of a plurality of different, predetermined time periods for delivery of said perservative gas to said enclosure.

15. A system for providing a delivering carbon dioxide to enclosure means containing a perishable food product comprising means for accumulating and temporarily storing a predetermined desired quantity of carbon dioxide in a gaseous state; adjustable, controllable means for withdrawing a predetermined, desired volume of an air-containing gas from said enclosure; adjustable, controllable means for directing the predetermined, desired quantity of carbon dioxide from said storing means to said enclosure; and means for temporarily preventing operation of said adjustable, controllable withdrawing means and said adjustable, controllable directing means while said means for storing is receiving an inflow of carbon dioxide.

16. The system of claim 15 further comprising means for heating and converting the carbon dioxide from liquid state to gaseous state.

17. The system of claim 15 further comprising means for holding carbon dioxide in a liquid state.

18. The system of claim 15 further comprising switch means for delivering a signal to each of said adjustable, controllable means to select one of a plurality of different, predetermined time periods for delivery of said perservative gas to said enclosure.

* * * * *